Figure 1:
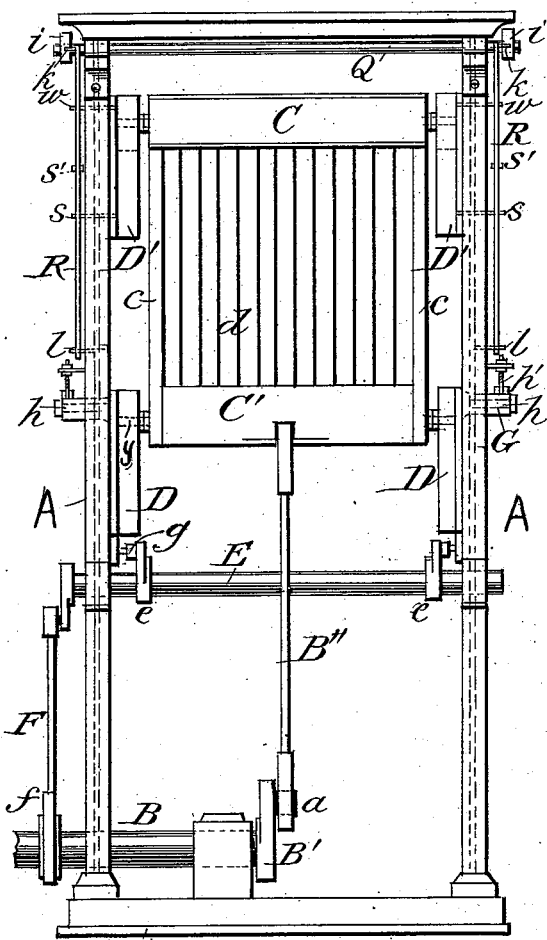

(No Model.) 4 Sheets—Sheet 1.

H. McEVILLA.
SAW MILL.

No. 377,630. Patented Feb. 7, 1888.

Witnesses
F. H. Schott
Fred E. Tasker

Inventor
Henry McEvilla
By his Attorney John C. Tasker (No Model.)  4 Sheets—Sheet 4.

H. McEVILLA.
SAW MILL.

No. 377,630. Patented Feb. 7, 1888.

Witnesses
F. H. Schott
Fred E. Tasker

Inventor
Henry McEvilla
By his Attorney John C. Tasker

UNITED STATES PATENT OFFICE.

HENRY McEVILLA, OF MUSKEGON, MICHIGAN.

SAW-MILL.

SPECIFICATION forming part of Letters Patent No. 377,630, dated February 7, 1888.

Application filed January 22, 1887. Serial No. 225,175. (No model.)

*To all whom it may concern:*

Be it known that I, HENRY McEVILLA, a citizen of the United States, residing at Muskegon, in the county of Muskegon and State of Michigan, have invented certain new and useful Improvements in Reciprocating-Saw Mills; and I do hereby declare the following to be a full, clear, and exact description of the invention, such as will enable others skilled in the art to which it appertains to make and use the same.

This invention relates to improvements in reciprocating-saw mills, and more particularly to improvements upon gang-mills, as represented in my Patent No. 339,000, bearing date March 30, 1886.

It is well known that a reciprocating device—such, for instance, as a saw driven by a crank having a uniform rate of revolution—has a continually-changing speed, it being stationary when in line with the crank or the crank is upon one of its dead-centers, and continuing to increase its speed from that point as the crank moves forward until the latter has reached a point where it is at right angles to the first position, from which point the speed of the reciprocating device decreases until the crank has reached the opposite dead-center, when it is again at a standstill. This increase and decrease of speed in the reciprocating device would be uniform were it not for the disturbing influence of the pitman or other connecting device used to connect the crank with the reciprocating body. As this pitman has a point upon the reciprocating body as a center of motion, its opposite end being attached to the crank and partaking of its motion, it follows that the speed of the reciprocating body will be greater while passing through the first quarter than it will be while passing through the last quarter of the stroke. Therefore, in order to carry the saw through the lower half of its reciprocation the crank must travel through a greater space than for its upper half; and as the forward feed of the log in these mills is not dependent upon the movement of the saw, but is continuous, being generally controlled by the rotation of the crank-shaft, it becomes necessary to provide means by which the movements of the saw shall be so regulated as to fully equalize the cut in the downstroke and give effective clearance upon the upstroke, so that the teeth of the saw shall each perform its proper part of the work in the downstroke and be kept away from the front of the cut during the upstroke. To accomplish this in a perfect manner is the object of the present invention. Ordinary oscillating gangs have tried to overcome this trouble by giving to the gate a rocking movement, the effect of which is to increase the strain on the saws at the beginning of the stroke, while the cutting-surface of the teeth is diminished.

The object attained by my arrangement and construction of parts is the entire absence of undue strain on any part of the saw, thus allowing the use of thinner saws, by virtue of which the speed of the gang can be increased accordingly, admitting at the same time the advantage of carrying as heavy feed as gangs of any other construction.

The invention may therefore be said to consist in so arranging the lower slides, upon which the saw or saws reciprocate in a gang or other reciprocating saw mill, that the pins upon which they oscillate shall be in such a position relatively to the pins carrying the lower end of the gate or saw as to equalize the cut during the first quarter of the downstroke with the other three parts of the same, and to free the saw or saws completely during the upstroke, and, further, to the devices employed for changing the position of the upper slides to give the rake corresponding with the rate of feed given to the log or cant, all as will be hereinafter fully set forth.

Figure 2:
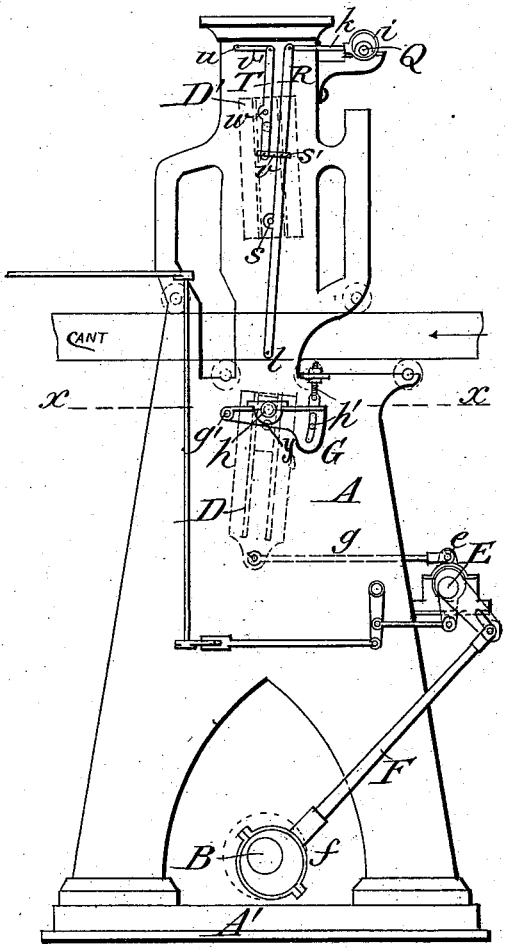
Figure 3:
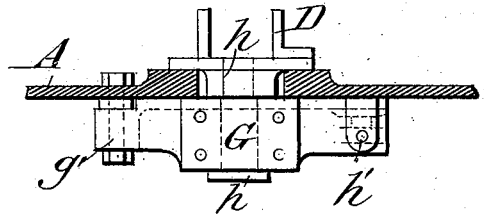
Figure 4:
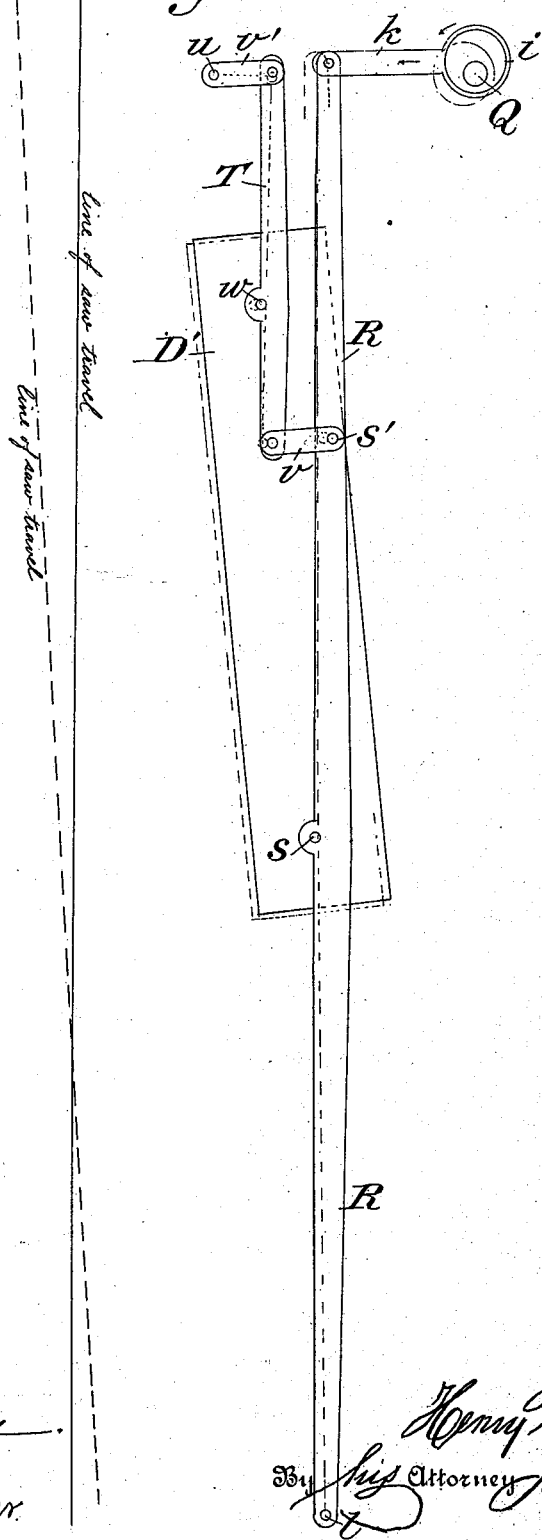
Figure 5:
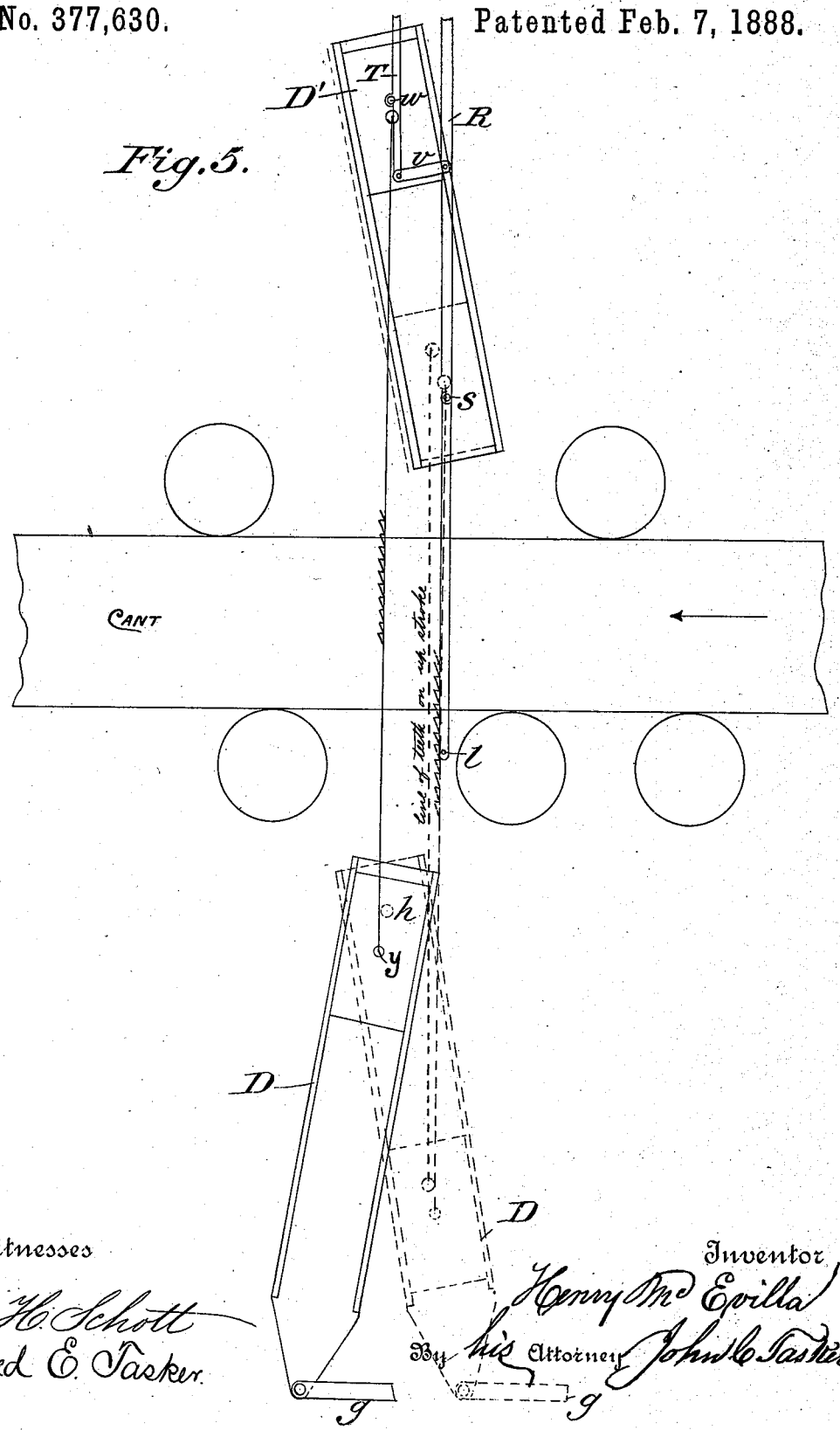
Figure 6:
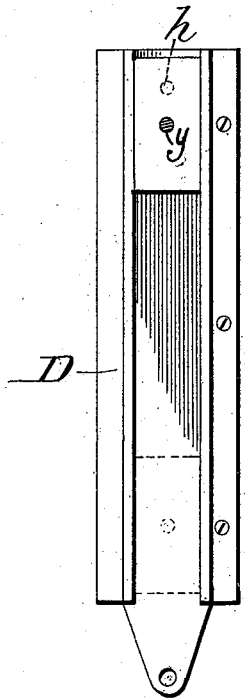
Figure 7:
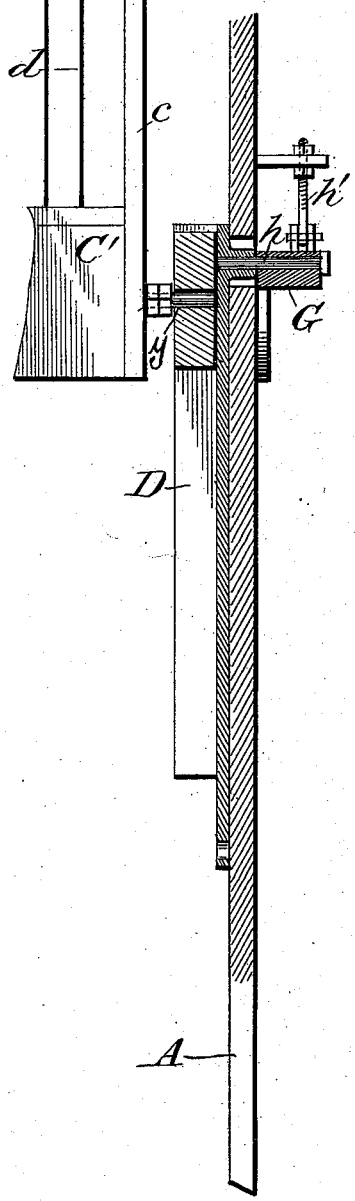
Figure 8:
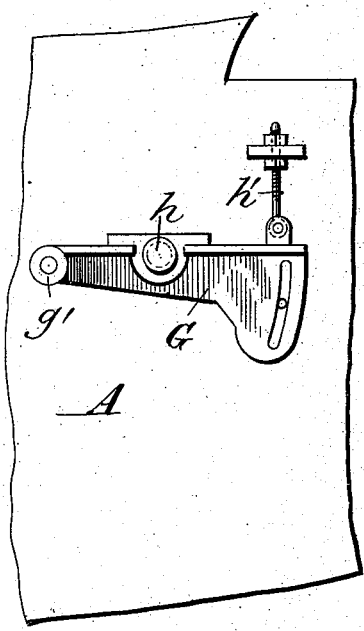

In the accompanying drawings, which illustrate my improvements as applied to a gang-saw mill, and in which similar letters of reference indicate like parts in the different figures, Figure 1 is a front elevation showing the gate and saws at the upper limit of the stroke. Fig. 2 is a side elevation showing the device employed to oscillate the lower slides and move the upper slides into any desired position. Fig. 3 is a horizontal section on the line *x x*, Fig. 2. Fig. 4 is an enlarged side view of the devices employed to move the upper slides. Fig. 5 is a diagram showing the relative movements of the crank and saw-gate and the corresponding cut of the same. Figs. 6, 7, and 8 are enlarged detail views showing the structure and arrangement of the lower slides and clearly indicating the relative positions of the pins on which said slides oscillate and the pins on the lower girder of the gate.

The sides of the gang-frames are represented by A A. A' is the bed; B, the crank-shaft, provided with crank B' and pin $a$; B'', the pitman for operating the gate; C C', the upper and lower girders or beams of the gate; $c\ c$, the stiles or rails for connecting the girders together and withstanding the strain of the saws; $d$, the saws for cutting the lumber. To the vertical sides A A of the frame are secured the slides D D', which carry the blocks on which the gate is carried. Across the frame, and carried in suitable bearings, extends the rock-shaft E, connected with the lower slides by means of the arms $e\ e$ and the connecting-rods $g\ g$, and which operates to oscillate these lower slides backward and forward.

F is an eccentric-rod connecting the eccentric $f$ on the crank-shaft B with the rock-shaft E, so as to actuate the latter and swing the slides D to produce the rake for each cut.

G G represent movable boxes, which carry pins $h$, firmly secured to the lower slides, D. These boxes are preferably hinged at one end by means of pins $g'$, fastened to the frame. The other end of each of these boxes is formed with a slotted lug, through which passes a pin, $h'$, this pin carrying an upwardly-extending screw-bolt, which is used for raising or lowering the box. This bolt passes through a lug cast on the frame, and is securely held in position by means of nuts on top and bottom of the same. The slot in the end of the box allows the necessary range of movement in a vertical direction, so that the box may be placed in any desired position, when it can be firmly held by means of the bolts and screws. The pins $h$ are fastened to the lower slides in some convenient manner (see Fig. 7) and made adjustable thereto, and they constitute the centers of oscillation of said slides. These pins are located below the top of the slides and above the pins $y$ on the lower girder of the gate when the latter is at the upper limit of its stroke. (See Figs. 5, 6, and 7.) They are so situated that the centers of these pins will be in the proper position with relation to the pins $y$, which are fastened to the lower girder and on which the slide-blocks oscillate to equalize the cut of the saws relatively to their speed, and thus make the cut in the first quarter of the stroke equal to that in the remainder of the stroke. By raising or lowering these boxes G G and pins $h$ a change is effected in the amount of the rake which takes place in the downward stroke.

The operation of this portion of my device is as follows: Suppose the gate to be at the upper end of its stroke. The saws will then be in a position to commence cutting. As they begin to descend, the motion at this point being slow, there will be no rake at the beginning for about one-eighth of the stroke. Then the rake increases in a certain ratio to the motion of the saws and feed of the log to equalize the cut in the first half of the stroke. Then the rate will decrease in a like ratio until the saw descends through about seven-eighths of the stroke, when again there will be no rake. This operation of the devices equalizes the cut through the entire length of the stroke. In the beginning and ending of the stroke, when the speed is very slow, the bottoms of the saws are made to recede from the log in proportion to the travel of the said saws; but the rake increases in proportion to the speed or travel of the saw. In changing the feed the rake should, in order to do good work, be changed in the same proportion. This is accomplished by giving the upper slides a perfectly-parallel backward and forward movement. In order to adjust the upper slides, D' D', to give a rake to the saws corresponding to the amount of feed carried, I prefer to use the devices which will now be described.

A shaft, Q, is carried in journal-bearings mounted upon brackets secured to the side pieces, A A, of the frame. Upon this shaft are secured the two eccentrics $i\ i$. The straps surrounding the eccentrics are connected by rods $k\ k$ with the upper ends of the levers R R, the lower ends of said levers being fulcrumed upon stationary pins $l'\ l'$, secured to the side pieces of the frame. At suitable points, as $s$, the levers R are connected to the lower ends of said upper slides, and at $s'$ the levers R are connected by means of a link, $v$, with the lower ends of the secondary levers T, the upper ends of which levers are connected with the stationary fulcrum-pins $u$ by the links $v'$. These secondary levers are pivotally attached at a proper point, as $w$, in their length to the upper part of the slides D' D'. It is therefore apparent that when the levers R and T are properly connected and arranged the joints $s$ and $w$ at which they are connected with the slides will have exactly the same motion, giving to the slides a perfectly-parallel backward and forward movement as the levers are moved by the eccentrics upon the motion of the shaft Q by any suitable means.

It is not my intention to confine myself in this application to the specific mechanism shown and described for changing the position of the upper slides. Various other mechanical appliances besides the eccentric might be made use of for changing the position of the slides so as to adjust the rake to the feed.

The operation of the mechanism hereinbefore described will be clearly understood from the following:

When the devices are applied to a long gate capable of cutting twenty-four-inch cants, the center of the pins $h$, upon which the lower slides oscillate, will be placed in such a position as to be about one-sixth of the length of stroke above the center of the pins $y$, which carry the lower end of the gate, when the latter is at the upper limit of its stroke; but when a short gate, or one cutting twelve-inch cants, is to be fitted with these rake-regulating devices the pins $y$ in the gate are so placed as to be about one-seventh of the length of the stroke below the pivot-pin $h$ of the slide at the upper limit of the stroke, and the lower end of the slide, where the pins are connected to the rods that move them, should oscillate about one and three-fourths inch. The eccentric $f$ on the crank-shaft B is set in such a position as to reverse the movement of the lower slides when the saws have passed through about seven-eighths of the downstroke. The upper slides are placed at such an inclination that the saws on the downstroke will move forward just the amount of rake or distance necessary for the amount of feed carried, and the lower slides at the ends of the stroke should stand at such an angle that the lines formed by the teeth of the saws at both the upper and lower limit of the stroke will be parallel.

Should it be deemed necessary to give the saws more or less clearance by giving the slides more or less oscillation, the pivot-pins of the slides should be raised or lowered in proportion to the amount of oscillation to preserve the equality of the cut.

Having thus described my invention, what I claim as new, and desire to secure by Letters Patent, is as follows:

1. In combination with the feed mechanism and the driving-shaft of a saw-mill gang, upper and lower slides carrying the saw gate or frame, and mechanism, substantially such as shown, for oscillating the lower slides, connected with and driven by the main driving-shaft, said lower slides having the pins on which they oscillate located below the top of the slides and above the pins on the lower girder of the gate when the latter is at the upper limit of its stroke, whereby the saws are made to recede from the log at the start, and thus the cut during the first quarter of the stroke equalized with the cut during the rest of the stroke, as specified.

2. In a reciprocating-saw mill, the combination, with the upper slides, of prime levers pivoted to the lower ends of the slides and fulcrumed on the frame, secondary levers pivoted to the upper ends of the slides and connected at the lower ends to the prime levers and at the upper to stationary fulcrum-pins, and a shaft provided with eccentrics connecting with the prime levers for operating said levers, substantially as and for the purposes set forth.

3. In a reciprocating-saw mill, the combination, with the upper slides, of a shaft journaled in bearings on the frame and carrying two eccentrics, the prime levers fulcrumed at their lower ends on the frame, connected at their upper ends to the eccentric-straps, and pivotally connected at suitable points to the lower ends of the slides, and the secondary levers pivotally attached at a proper point in their length to the upper part of the slides and connected at their lower ends by links with the prime levers and at their upper ends by links with stationary fulcrum-pins, all arranged to give a backward or forward movement to said slides for the purpose of increasing or decreasing the rake of the saws, substantially as described.

4. In a reciprocating-saw mill, the combination of the saw-gate, the oscillating lower slides, the movable upper slides, the primary levers pivoted to the lower ends of the upper slides and fulcrumed on the frame, and the secondary levers pivoted to the upper part of the upper slides and connected at their lower ends to the primary levers and at their upper ends to stationary fulcrum-pins, substantially as described.

In testimony whereof I affix my signature in presence of two witnesses.

HENRY McEVILLA.

Witnesses:
G. W. SMITH,
D. J. MORIARTY.